Patented Mar. 27, 1923.

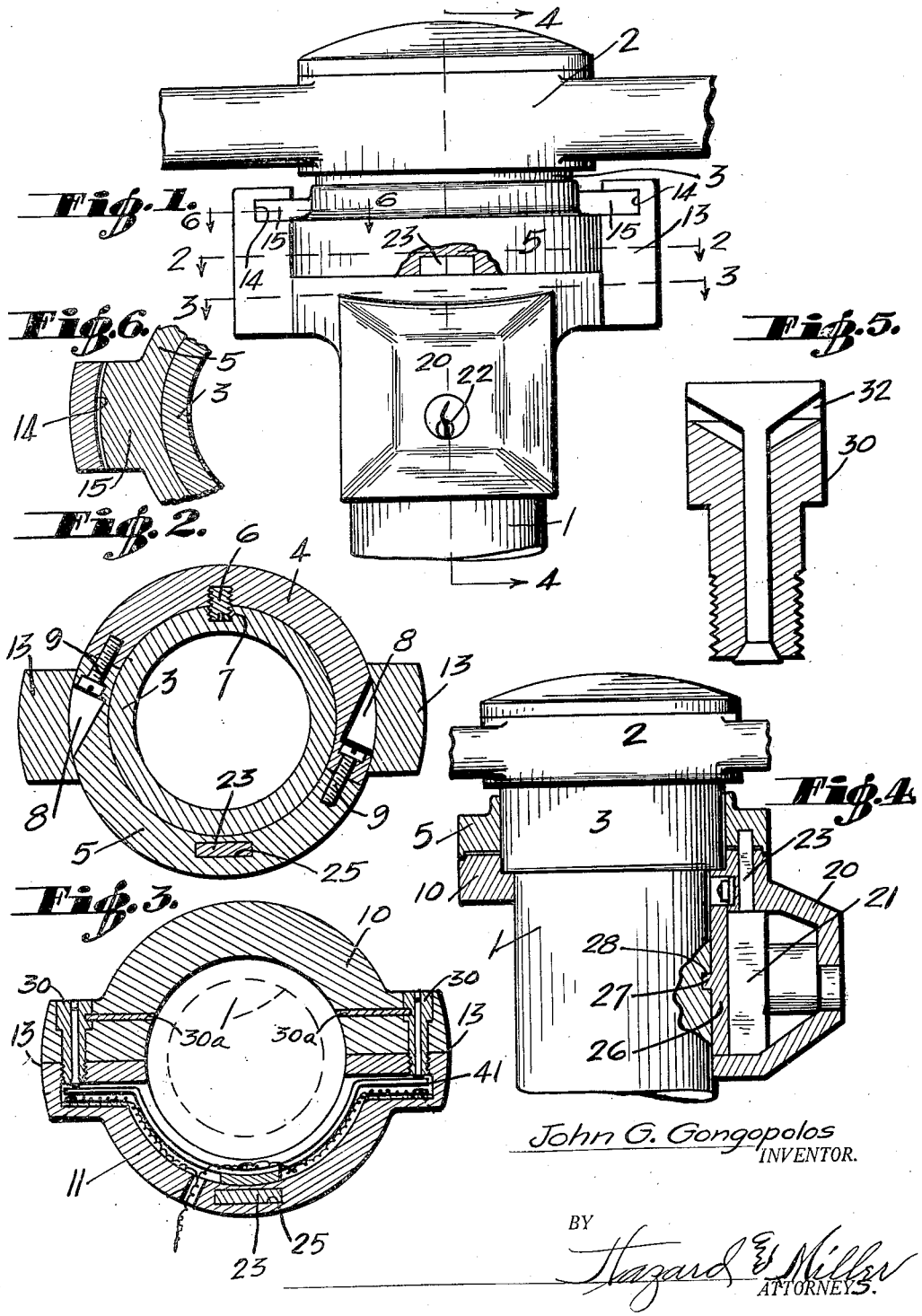

1,450,073

UNITED STATES PATENT OFFICE.

JOHN G. GONGOPOLOS, OF SANTA BARBARA, CALIFORNIA.

STEERING-WHEEL LOCK.

Application filed May 11, 1921. Serial No. 468,774.

*To all whom it may concern:*

Be it known that I, JOHN G. GONGOPOLOS, a citizen of the United States, residing at Santa Barbara, in the county of Santa Barbara and State of California, have invented new and useful Improvements in Steering-Wheel Locks, of which the following is a specification.

This invention is a locking means adapted to be employed in connection with the steering wheel of a motor vehicle, or the like, and including a suitable lock structure, preferably key controlled, arranged so that the bolt of the lock may engage a member fixed to the steering wheel for preventing turning thereof.

The invention will be readily understood from the following description of the accompanying drawings, in which:

Figure 1 is a fragmentary side elevation of a steering wheel and steering column showing the improved apparatus in operative position thereon.

Figs. 2 and 3 are transverse sections on the lines 2—2 and 3—3 of Fig. 1.

Fig. 4 is a vertical section through the attachment, upon the line 4—4 of Fig. 1, and showing the steering column and steering wheel in side elevation.

Fig. 5 is an enlarged vertical section through one of the contact bolts shown in Fig. 3.

Fig. 6 is a detail section on the line 6—6 of Fig. 1.

The lock mechanism may be employed in connection with a usual automobile steering mechanism including steering column 1 upon which is mounted the steering wheel 2 provided with the usual steering wheel collar 3. The lock includes a split ring fixed upon collar 3 and comprising sections 4 and 5 adapted to form an annulus received around the collar 3. One of the sections is provided with an inwardly extending set screw 6 adapted to engage in a co-operating bore 7 in collar 3 for preventing relative rotation of the steering wheel and collar and the split ring when the sections of the split ring are fastened together.

The fastening means for the split ring sections includes recesses 8 in opposite ends of the respective sections and which are adapted to receive screws 9 threaded into the adjacent ends of the other sections, it being noted that the recesses 8 provide for countersinking screws 9 below the outer surface of the split ring.

A lock structure is fixed upon the steering column below the split ring 4—5, and said lock structure is a split construction including sections 10 and 11 adapted to form an annulus surrounding column 1. The ends of the sections 10 and 11 form ears 13 through which fastening bolts are received, and said ears are extended longitudinally of the apparatus, and are provided with circumferential grooves 14 adapted to receive ears 15 projecting from the split ring structure 4—5. The lock structure is fixed against rotation upon steering column 1, as will be hereinafter described, and the parts are arranged with ears 15 at the respective screw receiving recesses 8 of the split ring structure 4—5, so that the extensions of ears 13 will overlie said recesses. As a consequence, the lock structure provides means for preventing access to the screws 9. It is therefore impossible for an unauthorized person to remove the split ring structure 4—5.

One of the sections of the lock structure, shown as section 11, is provided with an extension 20 which receives a usual lock mechanism 21 adapted to be controlled by a key inserted in keyhole 22 of said lock mechanism. The lock also includes a bolt 23 adapted to be retracted within the extension chamber 20, or projected longitudinally of the mechanism beyond the lock structure so as to engage in a co-operating recess 25 provided in the split ring structure 4—5.

The lock structure may be fixed against rotation upon steering column 1 by means of a plate 26 received in extension 20 between the lock mechanism and the steering column, this plate being provided with a projection 27 adapted to engage a co-operating recess 28 in the steering column. By this arrangement it will be seen that when the bolt of the lock is projected to engage the split ring 4—5, said ring will be held against rotation, and as a consequence will prevent turning of the steering wheel.

Fastening bolts, which are shown at 30, may be received through the ears of one of the sections of the lock structure and threaded into the ears of the other section of the lock structure. The bolts may be locked in position by means of pins 30ª extending through section 10 of the lock structure and engaging the bolts. The heads of the bolts are provided with usual grooves 32 adapted to be engaged by a screw driver, or the like, for turning the bolts.

Reference is made to my divisional application filed April 15, 1922, Serial No. 553,218 wherein the subject matter relative to the signal forming apparatus is described and claimed.

Various changes may be made without departing from the spirit of the invention as claimed.

What is claimed is:

1. In combination with a steering column and its wheel, a split ring fastened to the wheel against rotation, said ring including a section with recessed ends and screws in the recesses for clamping the mutual sections, and a split lock shell secured on the column below said ring and having ears to cover the said recessed ends and screws, said shell having a locking bolt to engage the ring.

2. In combination with a steering column and its wheel, a split ring fastened to the wheel against rotation, by an inwardly projecting concealed set screw, said ring including a section with recessed ends and screws in the recesses for clamping the mutual sections, and a split lock shell secured on the column below said ring and having ears to cover the said recessed ends and screws, said shell having a locking bolt to engage the ring.

3. In combination with a steering column and its wheel, a split ring fastened to the wheel against rotation by an inwardly projecting concealed set screw, said ring including a section with recessed ends and screws in the recesses for clamping the mutual sections, and a split lock shell secured on the column below said ring and having ears to cover the said recessed ends and screws, said shell having a locking bolt to engage the ring, said ring having side lugs received in grooves in the ears.

In testimony whereof I have signed my name to this specification.

JOHN G. GONGOPOLOS.